(12) United States Patent
Postevka

(10) Patent No.: US 9,545,694 B2
(45) Date of Patent: Jan. 17, 2017

(54) CYLINDRICAL VALVE ASSEMBLY

(71) Applicant: Valentin Postevka, Gilbert, AZ (US)

(72) Inventor: Valentin Postevka, Gilbert, AZ (US)

(73) Assignee: Valentin Postevka, Gilbert, AZ (US)

( * ) Notice: Subject to any disclaimer, the term of this patent is extended or adjusted under 35 U.S.C. 154(b) by 0 days.

(21) Appl. No.: 14/864,055

(22) Filed: Sep. 24, 2015

(65) Prior Publication Data

US 2016/0025230 A1    Jan. 28, 2016

Related U.S. Application Data

(63) Continuation-in-part of application No. 14/331,733, filed on Jul. 15, 2014.
(Continued)

(51) Int. Cl.
     *F16K 5/04*      (2006.01)
     *F16K 13/02*     (2006.01)
(Continued)

(52) U.S. Cl.
     CPC ............... *B23P 15/001* (2013.01); *F02D 9/16* (2013.01); *F16K 5/0421* (2013.01); *F16K 13/02* (2013.01)

(58) Field of Classification Search
     CPC ...... F16K 13/02; F16K 5/0421; F16K 5/0471; F16K 5/04; F16K 1/165; F16K 1/18; F16K 1/2021; B23P 15/001
(Continued)

(56) References Cited

U.S. PATENT DOCUMENTS 2,357,341 A * 9/1944 Miner ................. G05D 7/0173
                                                        137/500
2,501,635 A * 3/1950 Schmidt ................. F16K 5/184
                                                        251/163
(Continued)

FOREIGN PATENT DOCUMENTS

DE       767182 C   *   1/1952  ............... F16K 5/04
DE       912395 C   *   5/1954  ............... F16K 5/04
(Continued)

OTHER PUBLICATIONS

Nov. 6, 014 International Search Report issued in International Patent Application No. PCT/US2014/046672.

*Primary Examiner* — Marina Tietjen
(74) *Attorney, Agent, or Firm* — Clements Bernard PLLC; Christopher L. Bernard; Lawrence A. Baratta, Jr.

(57) ABSTRACT

A cylindrical valve assembly, including: a housing defining a port, an interior volume, and an interior surface; a lip structure disposed about the periphery of the port, wherein the lip structure protrudes into the interior volume past the interior surface of the housing; and a valve door defining an exterior surface disposed concentrically within the housing, wherein the valve door is configured to move from an open configuration in which it does not obstruct the port to a closed configuration in which it does obstruct the port, and wherein, when the valve door is in the closed configuration, the exterior surface of the valve door is in contact with the lip structure and not the interior surface of the housing. Optionally, the lip structure is provided by an insert structure that is disposed through the port. Optionally, an end of the insert structure opposite the lip structure includes a velocity stack. Optionally, a plurality of dimples are manufactured into the exterior surface of the valve door.

12 Claims, 9 Drawing Sheets

Related U.S. Application Data

(60) Provisional application No. 61/847,595, filed on Jul. 18, 2013.

(51) Int. Cl.
*F02D 9/16* (2006.01)
*B23P 15/00* (2006.01)

(58) Field of Classification Search
USPC .............. 251/298–301, 304, 309–312, 147
See application file for complete search history.

(56) References Cited

U.S. PATENT DOCUMENTS

| | | | | |
|---|---|---|---|---|
| 3,387,817 A | * | 6/1968 | Seguenot | F16K 5/04 251/317 |
| 3,506,239 A | * | 4/1970 | Johnson | F16K 5/04 251/172 |
| 3,674,238 A | * | 7/1972 | Pickles | F16K 5/04 137/904 |
| 3,689,026 A | * | 9/1972 | Self | F16K 5/204 251/160 |
| 3,704,003 A | * | 11/1972 | Harter | F16K 27/065 251/312 |
| 3,742,983 A | * | 7/1973 | Harter | F16K 5/04 137/625.47 |
| 3,966,119 A | * | 6/1976 | Harter | B60H 1/00485 137/625.47 |
| 3,990,676 A | | 11/1976 | Brownstein | |
| 4,050,472 A | * | 9/1977 | Sheppard | B60H 1/00485 137/242 |
| 5,199,769 A | | 4/1993 | Beck et al. | |
| 5,315,963 A | | 5/1994 | Warf | |
| 5,392,826 A | * | 2/1995 | Saville | B64D 11/02 137/800 |
| 5,535,784 A | * | 7/1996 | Saville | B64D 11/02 137/800 |
| 6,394,425 B1 | | 5/2002 | Nagata | |
| 6,395,048 B1 | | 5/2002 | Yoder et al. | |
| 6,789,565 B2 | * | 9/2004 | Allen | B65G 53/46 137/377 |
| 7,921,876 B2 | | 4/2011 | Wright et al. | |
| 2006/0130783 A1 | | 6/2006 | Ohtsuji | |
| 2008/0053544 A1 | * | 3/2008 | Wears | F16K 47/04 137/625.33 |
| 2011/0120414 A1 | | 5/2011 | Quantz | |
| 2011/0265770 A1 | | 11/2011 | Malfa et al. | |

FOREIGN PATENT DOCUMENTS

| | | | | |
|---|---|---|---|---|
| DE | CH 415208 A | * | 6/1966 | ............... F16K 5/04 |
| DE | CA 2308632 A1 | * | 4/1999 | ......... F02B 27/0284 |
| FR | 1055606 A | * | 2/1954 | ............. F16K 13/02 |
| JP | WO 2013176234 A1 | * | 11/2013 | ................ F01P 7/14 |

* cited by examiner

CYLINDRICAL VALVE ASSEMBLY

CROSS-REFERENCE TO RELATED APPLICATION

The present disclosure is a continuation-in-part (CIP) of co-pending U.S. patent application Ser. No. 14/331,733, filed on Jul. 15, 2014, and entitled "CYLINDRICAL VALVE ASSEMBLY," which claims the benefit of priority of U.S. Provisional Patent Application No. 61/847,595, filed on Jul. 18, 2013, and entitled "CYLINDRICAL VALVE ASSEMBLY," the contents of both of which are incorporated in full by reference herein.

FIELD OF THE DISCLOSURE

The present disclosure relates generally to an improved cylindrical valve assembly. More specifically, the present disclosure relates to an improved cylindrical valve assembly that provides a substantially constant internal geometry and volume upon actuation, such that the internal intake flow is substantially constant and uninterrupted. The improved cylindrical valve assembly of the present disclosure (also variously referred to as a rotary valve, a roller valve, a barrel valve, a butterfly valve, or a throttle body, for example) finds particular applicability in the throttle assembly of an engine, although other applications are contemplated herein.

BACKGROUND OF THE DISCLOSURE

Numerous cylindrical valves, rotary valves, roller valves, barrel valves, butterfly valves, and throttle bodies are known to those of ordinary skill in the art. These valves all suffer from a common shortcoming—when the shutter mechanism is actuated, the internal geometry and volume of the valve assembly is changed and the internal intake flow through the valve housing is undesirably interrupted. In the case of a throttle body, this results in an undesirable interruption in the internal airflow, for example. The result is decreased efficiency and performance. Thus, an improved cylindrical valve is still needed in the art, and is provided by the present disclosure.

BRIEF SUMMARY OF THE DISCLOSURE

In various exemplary embodiments, the present disclosure provides an improved cylindrical valve assembly that maintains a substantially constant internal geometry and volume upon actuation, when the shutter mechanism/valve door(s) is/are opened or closed, such that the internal intake flow is substantially constant and uninterrupted.

In one exemplary embodiment, the present disclosure provides a cylindrical valve assembly, including: a housing providing a fluid flow channel there through; a cylindrical core disposed within the housing and providing a fluid flow channel there through; and a cylindrical valve door disposed between the housing and the cylindrical core; wherein, when the cylindrical valve door is rotatably actuated, the fluid flow channels through the housing and the cylindrical core are one of opened and closed; and wherein the cylindrical valve door does not protrude into any portion of the interior of the cylindrical core when rotatably actuated.

In another exemplary embodiment, the present disclosure provides a throttle body, including: a housing providing an intake flow channel there through; a cylindrical core disposed within the housing and providing an intake flow channel there through; and a cylindrical valve door disposed between the housing and the cylindrical core; wherein, when the cylindrical valve door is rotatably actuated, the intake flow channels through the housing and the cylindrical core are one of opened and closed; and wherein the cylindrical valve door does not protrude into any portion of the interior of the cylindrical core when rotatably actuated.

In a further exemplary embodiment, the present disclosure provides a cylindrical valve assembly, including: a housing defining a fluid flow channel there through; a cylindrical core disposed within the housing and defining a fluid flow channel there through; and at least one cylindrical valve door disposed between the housing and the cylindrical core; wherein, when the at least one cylindrical valve door is actuated, the fluid flow channels through the housing and the cylindrical core are one of opened and closed; and wherein the at least one cylindrical valve door does not protrude into any portion of the interior of the cylindrical core when actuated. Preferably, the at least one cylindrical valve door includes a pair of cylindrical valve doors. The pair of cylindrical valve doors are simultaneously actuated in equal and opposite directions. The pair of cylindrical valve doors are coupled via a gear assembly or the like. The pair of cylindrical valve doors are coupled to and actuated via the rotation of at least one shaft. The pair of cylindrical valve doors are coupled to and actuated by a spring. Optionally, the housing and the cylindrical core are integrally formed.

In a still further exemplary embodiment, the present disclosure provides a throttle body, including: a housing defining a fluid flow channel there through; a cylindrical core disposed within the housing and defining a fluid flow channel there through; and at least one cylindrical valve door disposed between the housing and the cylindrical core; wherein, when the at least one cylindrical valve door is actuated, the fluid flow channels through the housing and the cylindrical core are one of opened and closed; and wherein the at least one cylindrical valve door does not protrude into any portion of the interior of the cylindrical core when actuated. Preferably, the at least one cylindrical valve door includes a pair of cylindrical valve doors. The pair of cylindrical valve doors are simultaneously actuated in equal and opposite directions. The pair of cylindrical valve doors are coupled via a gear assembly or the like. The pair of cylindrical valve doors are coupled to and actuated via the rotation of at least one shaft. The pair of cylindrical valve doors are coupled to and actuated by a spring. Optionally, the housing and the cylindrical core are integrally formed.

In a still further exemplary embodiment, the present disclosure provides a cylindrical valve assembly, including: a housing defining a port, an interior volume, and an interior surface; a lip structure disposed about the periphery of the port, wherein the lip structure protrudes into the interior volume past the interior surface of the housing; and a valve door defining an exterior surface disposed concentrically within the housing, wherein the valve door is configured to move from an open configuration in which it does not obstruct the port to a closed configuration in which it does obstruct the port, and wherein, when the valve door is in the closed configuration, the exterior surface of the valve door is in contact with the lip structure and not the interior surface of the housing. Optionally, the valve door includes a pair of valve doors. Optionally, the lip structure is provided by an insert structure that is disposed through the port. Optionally, an end of the insert structure opposite the lip structure includes a velocity stack. Optionally, a plurality of recesses are manufactured into the exterior surface of the valve door. Optionally, the plurality of recesses includes a plurality of dimples.

In a still further exemplary embodiment, the present disclosure provides a method for providing a cylindrical valve assembly, including: providing a housing defining a port, an interior volume, and an interior surface; providing a lip structure disposed about the periphery of the port, wherein the lip structure protrudes into the interior volume past the interior surface of the housing; and providing a valve door defining an exterior surface disposed concentrically within the housing, wherein the valve door is configured to move from an open configuration in which it does not obstruct the port to a closed configuration in which it does obstruct the port, and wherein, when the valve door is in the closed configuration, the exterior surface of the valve door is in contact with the lip structure and not the interior surface of the housing. Optionally, the valve door includes a pair of valve doors. Optionally, the lip structure is provided by an insert structure that is disposed through the port. Optionally, an end of the insert structure opposite the lip structure includes a velocity stack. Optionally, a plurality of recesses are manufactured into the exterior surface of the valve door. Optionally, the plurality of recesses includes a plurality of dimples.

In a still further exemplary embodiment, the present disclosure provides a cylindrical valve assembly, including: a housing defining a port and an interior surface; and a valve door defining an exterior surface disposed concentrically within the housing and in contact with the interior surface, wherein the valve door is configured to move from an open configuration in which it does not obstruct the port to a closed configuration in which it does obstruct the port; wherein a recess is manufactured into a portion of the interior surface of the housing that provides a gap between the portion of the interior surface of the housing and a portion of the exterior surface of the valve door when the valve door is in the open configuration. Optionally, the valve door includes a pair of valve doors and the recess includes a pair of recesses. Optionally, a velocity stack is coupled to an exterior surface of the hosing about the periphery of the port. Optionally, a plurality of recesses are manufactured into the exterior surface of the valve door. Optionally, the plurality of recesses includes a plurality of dimples.

BRIEF DESCRIPTION OF THE DRAWINGS

The present disclosure is illustrated and described with reference to the various drawings, in which like reference numbers are used to denote like assembly components/method steps, as appropriate, and in which.

DETAILED DESCRIPTION OF THE DISCLOSURE

Again, in various exemplary embodiments, the present disclosure provides an improved cylindrical valve assembly that maintains a substantially constant internal geometry and volume upon actuation, when the shutter mechanism/valve door is opened or closed, such that the internal intake flow is substantially constant and uninterrupted.

Figure 1:
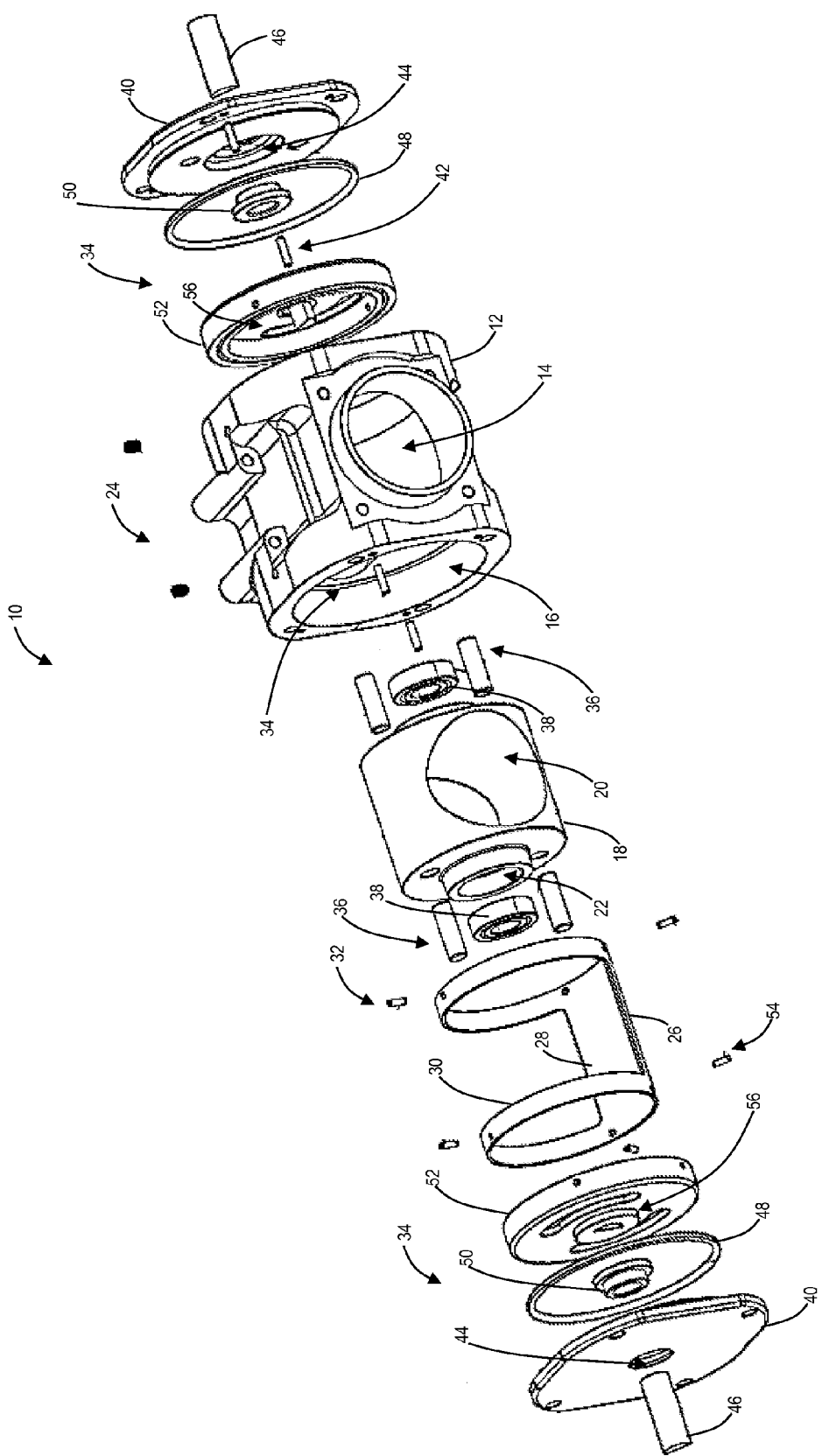
FIG. 1 is an exploded perspective view of one exemplary embodiment of the cylindrical valve assembly of the present disclosure.

Referring now specifically to FIG. 1, in one exemplary embodiment, the cylindrical valve assembly 10 includes a housing 12. The housing 12 includes a substantially cylindrical interior portion and an exterior portion that includes any desired structures for attaching the housing 12 to an external system, such as an engine or the like. The housing 12 includes a pair of first ports 14 for receiving and delivering the intake flow and a pair of second ports 16 for receiving the other components of the cylindrical valve assembly 10. A cylindrical core 18 is fixedly disposed within the housing 12. The cylindrical core 18 includes a pair of third ports 20 that coincide with the pair of first ports 14 of the housing 12, thereby communicating the intake flow through the cylindrical core 18 and the housing 12. The cylindrical core 18 also includes a pair of fourth ports 22 for receiving the other components of the cylindrical valve assembly 10. The cylindrical core 18 is secured within the housing using a plurality of dowel pins 36 or the like. A plurality of set screws 24 or the like are disposed in a plurality of manufactured holes that receive a plurality of spring pin locks 54 or the like, described in greater detail herein below, thereby providing the required environmental isolation. Advantageously, the cylindrical core 18 provides the interior of the housing 12 with a constant geometry and volume for the intake flow.

A cylindrical valve door 26 is disposed between the housing 12 and the cylindrical core 18 and is configured to rotate around the cylindrical core 18, thereby opening or closing one of the first ports 14 of the housing 12 and third ports 20 of the cylindrical core 18, thus altering the intake flow through the housing 12 and cylindrical core 18. This is the valve portion of the cylindrical valve assembly 10. In this exemplary embodiment, the cylindrical valve door 26 includes a door structure 28 and a pair of ring structures 30 that surround the cylindrical core 18. The door structure 28 is shaped and sized such that it completely obstructs the first port 14 and the third port 20 when the cylindrical valve assembly 10 is in a closed configuration. Preferably, the door structure 28 is thin, such that it provides minimal intrusion into the interior of the housing 12 and cylindrical core 18 and may be retracted between the housing 12 and cylindrical core 18. In this exemplary embodiment, the cylindrical valve door 26 is rotatably secured between the housing 12 and the cylindrical core 18 using the plurality of spring pin locks 54 that lock the cylindrical valve door 26 to rotating cylindrical covers 52 that engage a cylindrical recess 34 within the interior of the housing 12, although it is contemplated that other suitable retention structures can be used.

Figure 2:
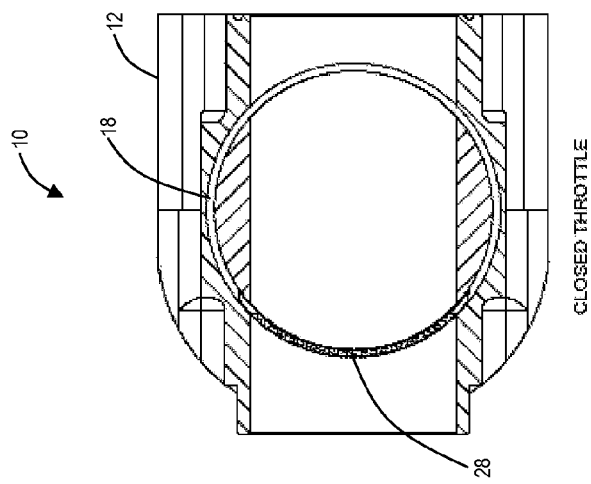
FIG. 2 is a series of cross-sectional side views of the cylindrical valve assembly of FIG. 1 in open flow (throttle), partial flow (throttle), and closed flow (throttle) configurations, illustrating the actuation of the cylindrically-conformal rotating valve door.
Figure 2:
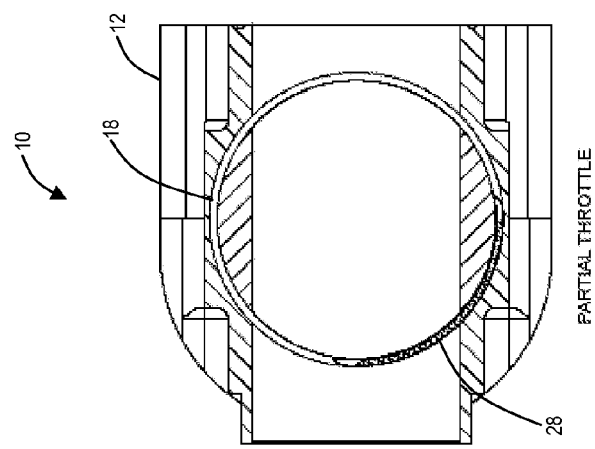
Figure 2:
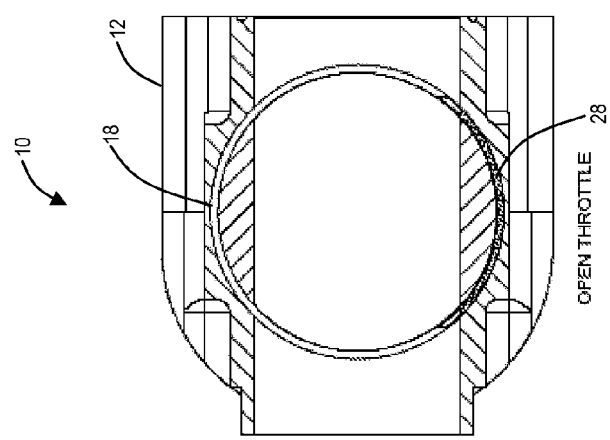

Referring now specifically to FIG. 2, in one exemplary embodiment, the relative position of the door structure 28 is illustrated between the housing 12 and cylindrical core 18 when the cylindrical valve assembly 10 is in open throttle, partial throttle, and closed throttle configurations, respectively.

Referring again specifically to FIG. 1, in one exemplary embodiment, the cylindrical valve door 26 is coupled to end assemblies 34 coupled to either end of the housing 12 and cylindrical core 18 using the plurality of dowel pins 36 and a bearing 38, although it is contemplated that other suitable retention structures can be used.

Each end assembly 34 includes an environmentally-sealed housing cover 40 that is coupled to the housing 12 using a plurality of dowel pins 42. Each housing cover 40 includes a port 44 for receiving a shaft 46 there through. Each shaft 46 passes through a sealing O-ring 48 and bushing 50 disposed between the housing covers 40 and housing 12, such that environmental isolation of the interior of the housing 12 and around the shafts 46 is ensured. Each shaft 46 is coupled to one of the rotating cylindrical covers 52 disposed within the housing 12 inside of each housing cover 40. These cylindrical covers 52 are each coupled to the cylindrical valve door 26 using the plurality of spring pin locks 54 or the like and serve to rotate the cylindrical valve door 26 within the housing 12 and about the cylindrical core 18 when the shafts 46 are rotated. In this exemplary embodiment, each cylindrical cover 52 includes a plurality of dowel pin slots 56 through which the plurality of dowel pins 36 pass, thereby coupling the cylindrical core 18 to each of the housing covers 40. In this exemplary embodiment, the interaction of these dowel pins slots 56 with the dowel pins 36 provides a predetermined limitation on the rotational motion of the cylindrical valve door 26 within the housing 12.

Figure 3:
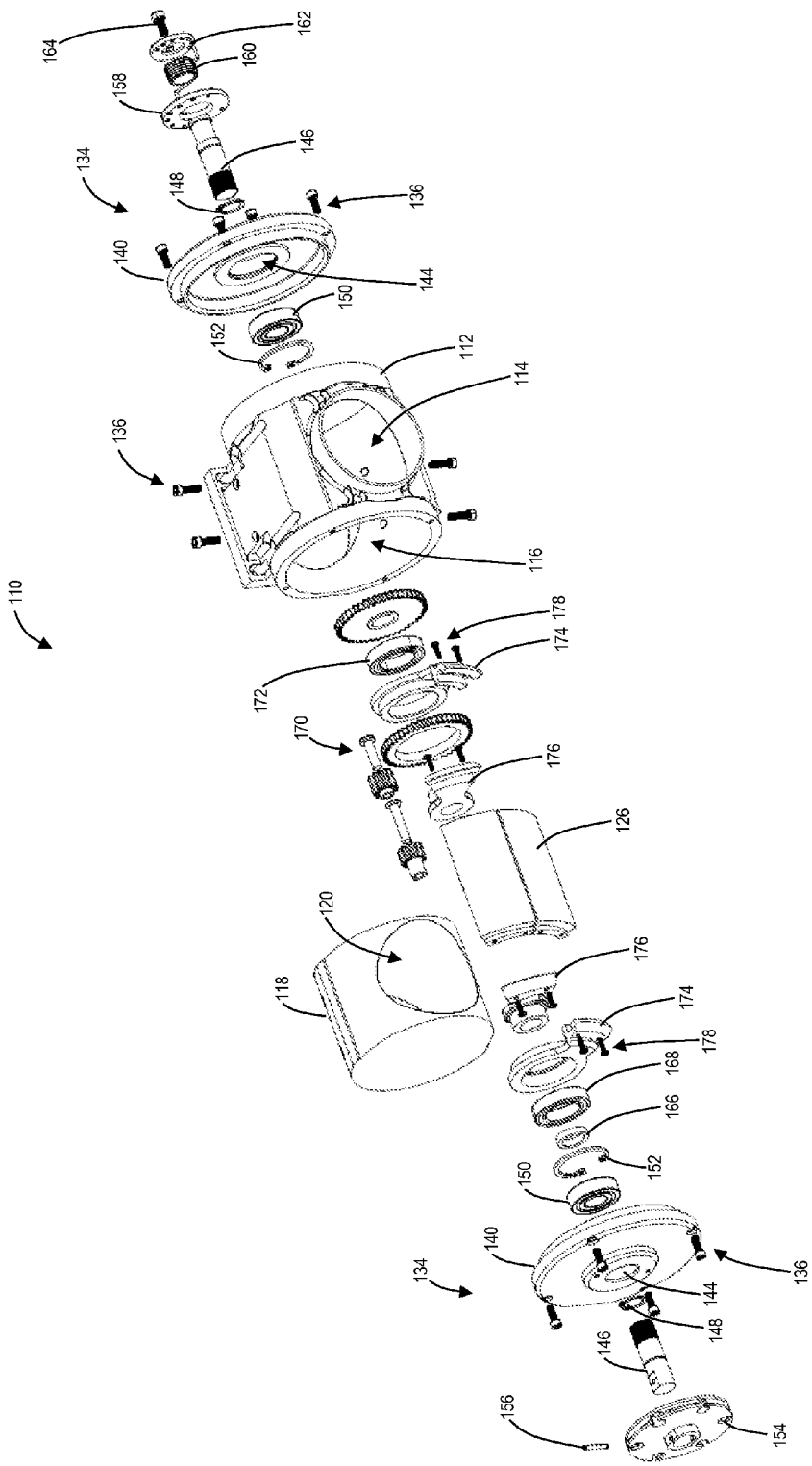
FIG. 3 is an exploded perspective view of another exemplary embodiment of the cylindrical valve assembly of the present disclosure.
Figure 4:
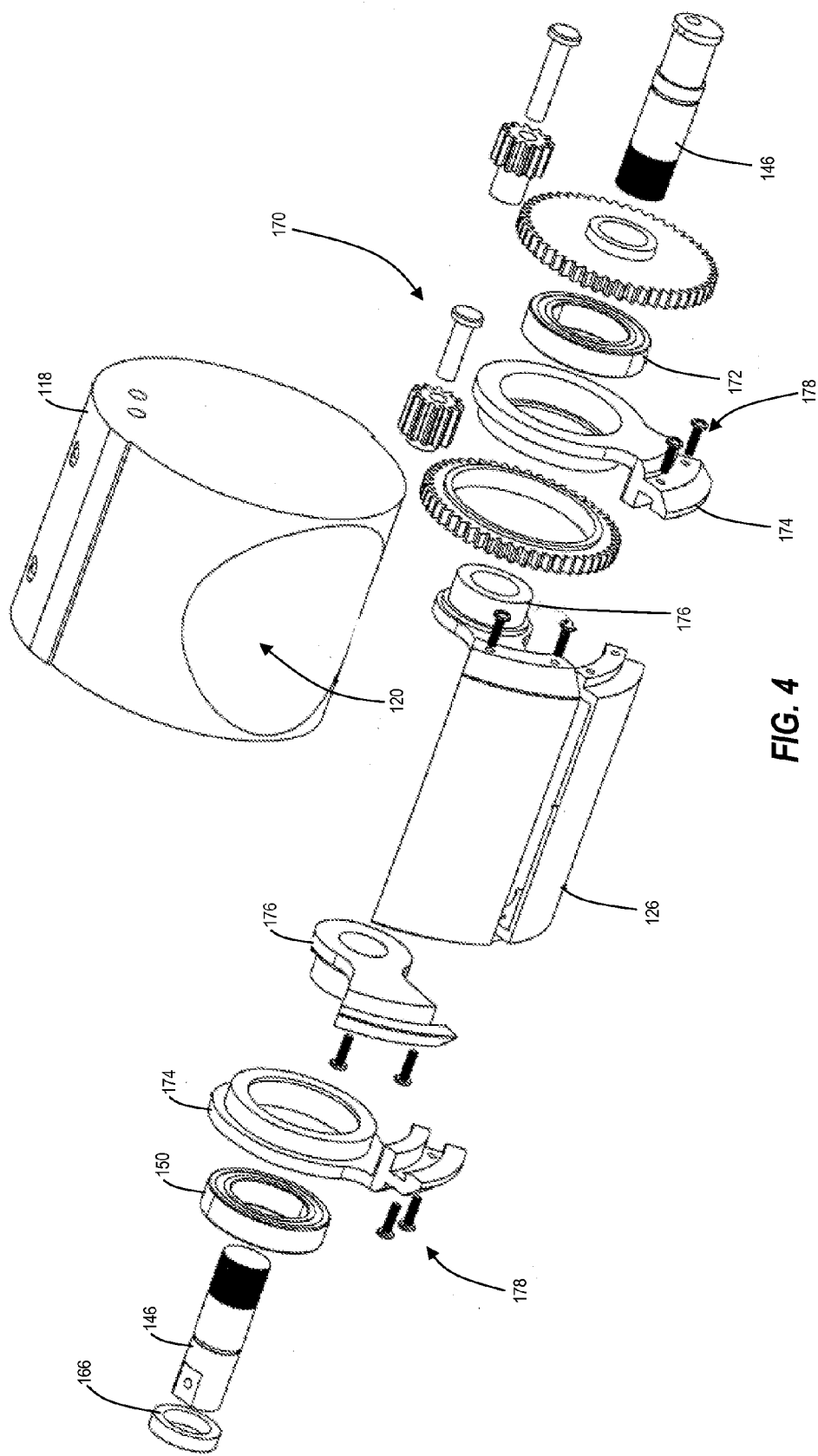
FIG. 4 is a partial exploded perspective view of the cylindrical valve assembly of FIG. 3, highlighting the door and gear assemblies.

Referring now specifically to FIG. 3, in another exemplary embodiment, the cylindrical valve assembly 110 includes a housing 112. The housing 112 includes a substantially cylindrical interior portion and an exterior portion that includes any desired structures for attaching the housing 112 to an external system, such as an engine or the like. The housing 112 includes an opposed pair of first ports 114 for receiving and delivering the intake flow and an opposed pair of second ports 116 for receiving the other components of the cylindrical valve assembly 110. Optionally, the pair of first ports 114 is offset longitudinally with respect to the housing 112, such that the housing 112 may suitably accommodate the gears disposed therein. A cylindrical core 118 is fixedly disposed within the housing 112. The cylindrical core 118 includes an opposed pair of third ports 120 that coincide with the opposed pair of first ports 114 of the housing 112, thereby communicating the intake flow through the cylindrical core 118 and the housing 112 collectively. The cylindrical core 118 is secured within the housing 112 using bolts 136 or the like. Advantageously, the cylindrical core 118 provides the interior of the housing 112 with a constant geometry and volume for the intake flow. All components of the cylindrical valve assembly 110 are manufactured from an appropriate metallic material or the like and may have any suitable dimensions, depending upon the desired application.

A pair of cylindrical valve doors 126 are disposed between the housing 112 and the cylindrical core 118 and are configured to open away from each other and close towards each other, thereby opening or closing one of the first ports 114 of the housing 112 and third ports 120 of the cylindrical core 118, thus selectively altering the intake flow through the housing 112 and cylindrical core 118. This is the valve portion of the cylindrical valve assembly 110. The door structures 126 are shaped and sized such that they completely obstruct the first port 114 and the third port 120 when the cylindrical valve assembly 110 is in a closed configuration. Preferably, the door structure 126 are relatively thin, such that they provide minimal intrusion into the interior of the housing 112 and cylindrical core 118 and may be retracted between the housing 112 and cylindrical core 118.

The cylindrical valve doors 126 are coupled to end assemblies 134 coupled to either end of the housing 112 and cylindrical core 118 using a plurality of bolts 136, although it is contemplated that other suitable retention structures can be used.

Each end assembly 134 includes an environmentally-sealed housing cover 140 that is coupled to the housing 112 using the plurality of bolts 136. Each housing cover 140 includes a port 144 for receiving a shaft 146 there through. Each shaft 146 passes through a retaining ring 148 that prevents the shaft 146 from moving longitudinally with respect to the housing 112, a double-sealed ball bearing 150 or the like that allows for free rotation of the associated shaft 146, and another retaining ring 152 that prevents the shaft 146 from moving longitudinally with respect to the housing 112. One of the shafts 146 is coupled to a throttle cable CAM or rotor 154 via a spring pin 156 or the like. The throttle cable CAM or rotor 154 receives a throttle cable (not illustrated) or the like. The other shaft 146 is coupled to a pair of spring retainers 158 and 162 and a spring 160 that actuates and closes the cylindrical valve assembly 110, the pair of spring retainers are operable for adjusting the tension of and locking the spring 160. These components are coupled to the shaft 146 by a suitable bolt 164 or the like.

The first shaft 146 described above is further disposed through a spacer washer 166 and a bearing 168. The spacer washer 166 offsets the gear assembly that is coupled to the other shaft 146, described in greater detail herein below, and the bearing 168 mounts on one of the cylinder doors 126, allowing it to move freely with respect to the other cylinder door 126. The second shaft 146 described above is further coupled to a plurality of gears 170 and disposed through a bearing 172. The plurality of gears 170 are collectively operable for opening one door 126 equal and opposite the other door 126 when one door 126 is actuated. Thus, the plurality of gears 170 translate actuation across the housing 112, causing the doors 126 to open and close in unison. It will be readily apparent to those of ordinary skill in the art that any suitable mechanism may be utilized to accomplish such purpose, gears being an exemplary means only. The bearing 172 mounts on one of the cylinder doors 126, allowing it to move freely with respect to the other cylinder door 126.

Each of the cylinder doors 126 is coupled to a pair of attachment structures 174 or 176 (via a plurality of bolts 178 or the like) that couple each cylinder door 126 to its respective shaft 146, while allowing it to move freely with respect to the other cylinder door 126. In the embodiment illustrated, these attachment structures 174 and 176 are nested structures, with one rotating freely inside the other, although other configurations could be utilized. In essence, each shaft 146 is coupled to a door 126, and the doors 126 are designed to actuate opposite one another (opening or closing together), this movement being biased by a coupling spring 160.

Again, in various exemplary embodiments, the present disclosure provides an improved cylindrical valve assembly that maintains a substantially constant internal geometry and volume upon actuation, when the shutter mechanism/valve door is opened or closed, such that the internal intake flow is substantially constant and uninterrupted.

Figure 5:
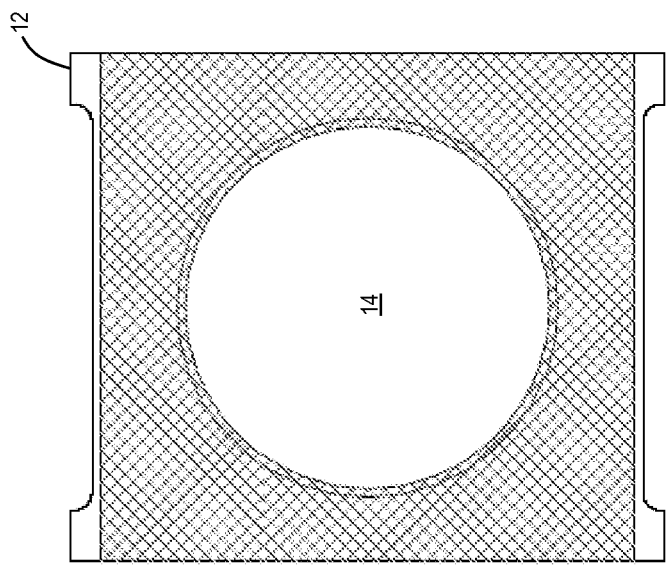
FIG. 5 is a series of cross-sectional an planar views of one exemplary embodiment of the housing and valve door of the cylindrical valve assembly of the present disclosure.
Figure 5:
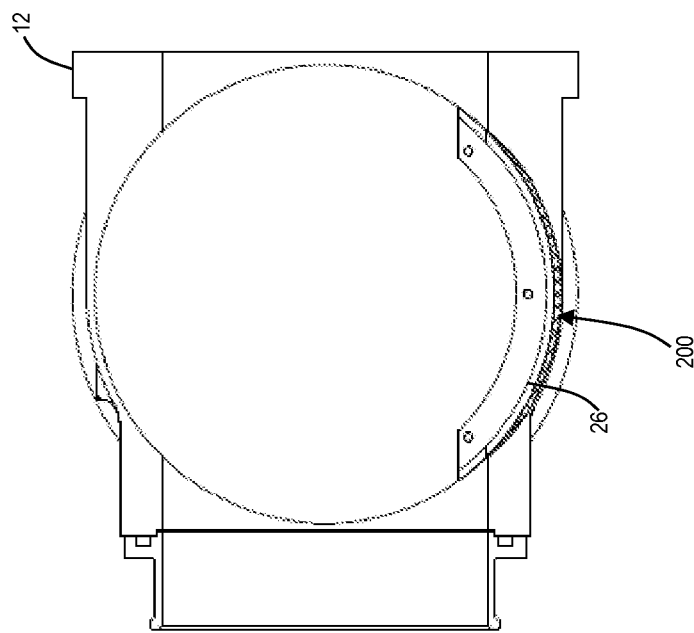

Referring now specifically to FIG. 5, a significant concern with the cylindrical valve assemblies 10 (FIGS. 1 and 2) and 110 (FIG. 3) of the present disclosure is reducing the contact surface area of the valve door 26 with the interior surface of the housing 12 during operation (see the cross-hatched area). This concern stems from the possibility of a "sticky" throttle, which could happen if foreign particles or gases from the crankcase build up and embed themselves over time. The concern is exacerbated by a close tolerance gap between the valve door 26 and the housing 12. One simple approach to alleviate the concern is to machine a recess or step 200 in the floor (or any other interior surface) of the housing 12, where the valve door 26 and housing 12 would meet in a normal open or partially-open position, for example.

Figure 6:
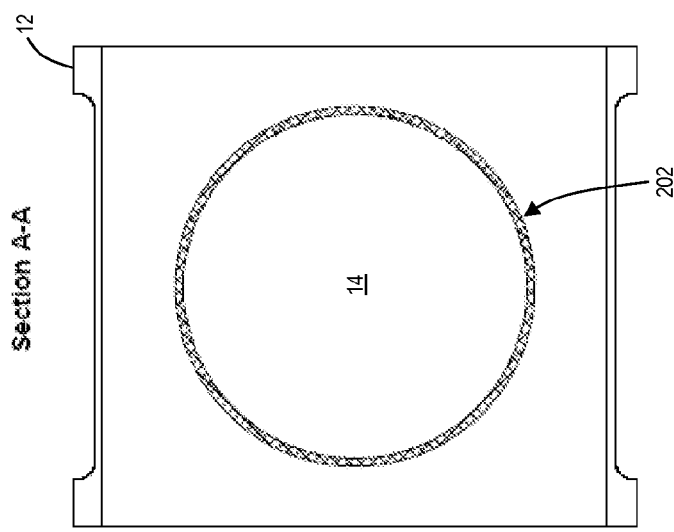
FIG. 6 is a series of cross-sectional an planar views of another exemplary embodiment of the housing of the cylindrical valve assembly of the present disclosure, the housing incorporating an internal valve seal.
Figure 6:
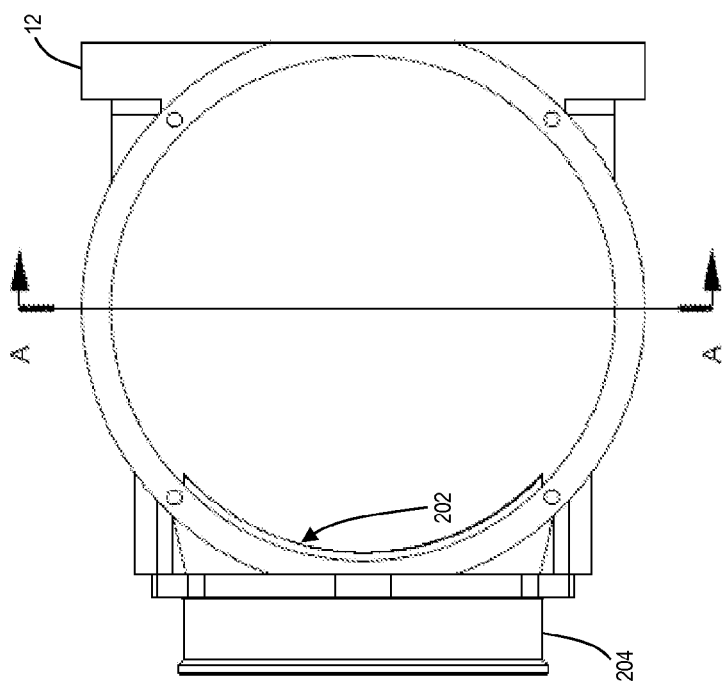

Referring now specifically to FIG. 6, removing some material from the interior of the housing 12 creates a proper gap that reduces the contact surface area significantly, but a "sticky" partial throttle may still result. The goal is to achieve a contact surface area equal to or less than that of a conventional butterfly throttle body. In order to achieve this small contact surface area, the concept is to remove all of the unnecessary material wherever possible between the housing 12 and the valve door 26 (FIG. 5) and to leave only a minimal contact surface area 202 that is needed to restrict the flow of air through the throttle body 10 and 110 when the valve door 26 is in a closed position. This results in an internal valve seal structure or insert 204 that creates the minimal contact surface area 202 that is sufficient to seal the throttle body 10 and 110 in a fully-closed configuration, for example, removing the task of the housing 12 itself being the seal for the valve door 26 and creating a proper gap clearance for any foreign particles or gas build-up.

Figure 7:
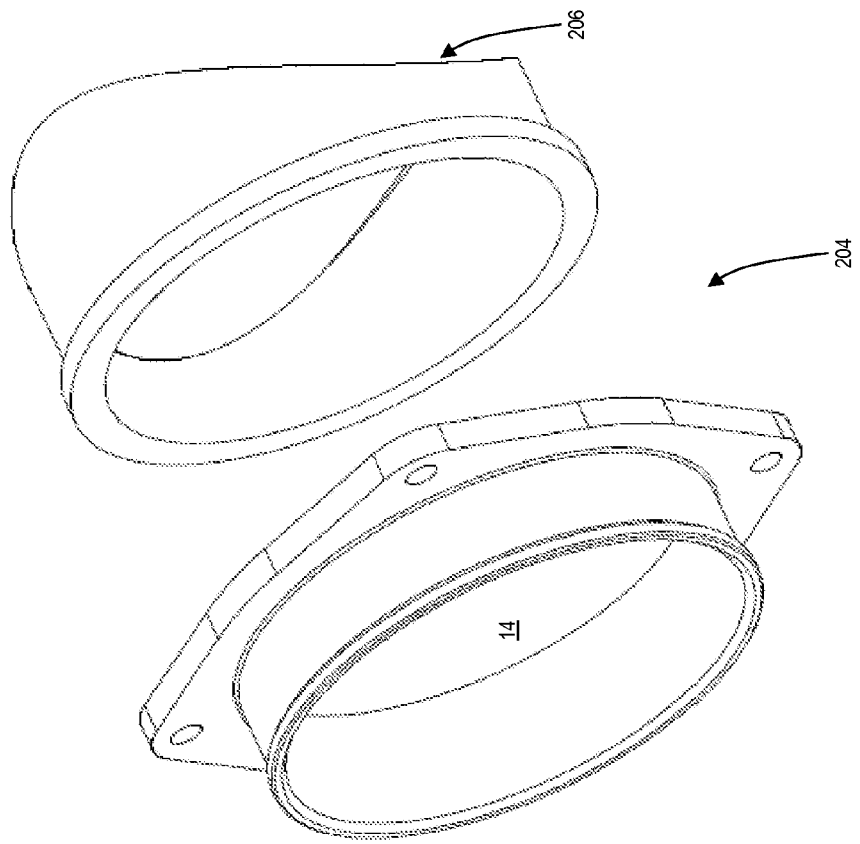
FIG. 7 is a series of perspective and exploded perspective views of one exemplary embodiment of the internal valve seal of FIG. 6.
Figure 7:
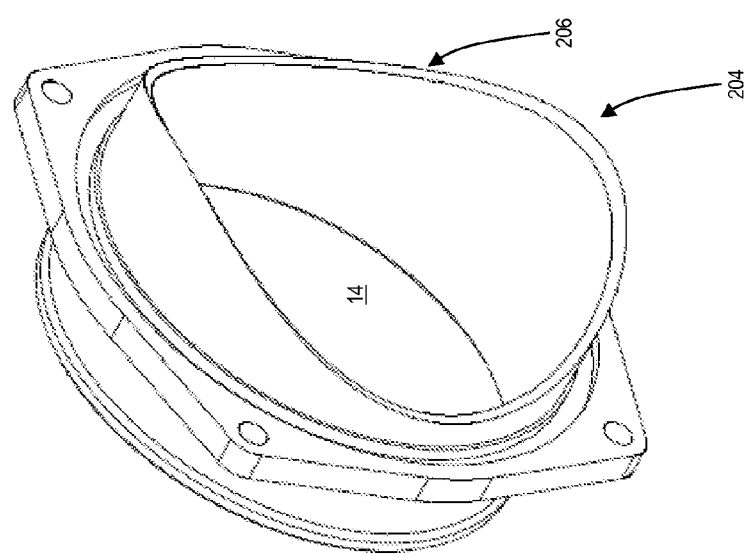

Referring now specifically to FIG. 7, in one exemplary embodiment, the seal 204 consists of a sealing lip structure that is disposed within the interior of the housing 12 (FIGS. 5 and 6) around the periphery of the port 14, or that is inserted through the port 14 from the exterior of the housing 12 and protrudes slightly into the interior of the housing 12 around the periphery of the port 14. This gives clearance for any foreign debris or vapors from crankcase that might build up over time. The seal 204 and the valve door 26 (FIG. 5) may be manufactured from different materials, such as in a butterfly throttle body where aluminum and bronze are used, to prevent galling. In general, the sealing lip structure 206 of the seal 204 has a shape that is conformal to the valve door 26.

In taking this concept further, the seal 204 and the valve door 26 may be designed to work either in the traditional front position, where the valve blocks the air at the beginning of the throttle body 10 and 110, or in a novel back position, where the air enters the throttle body 10 and 110 and the back of the valve door 26 is in contact with the air. This gives the installer options with different advantages and disadvantages, depending on the desired outcome.

The seal 204 is not limited to a single part, but may be incorporated into the intake bracket or even into the housing 12 itself with other manufacturing processes, as described herein above.

Figure 8:
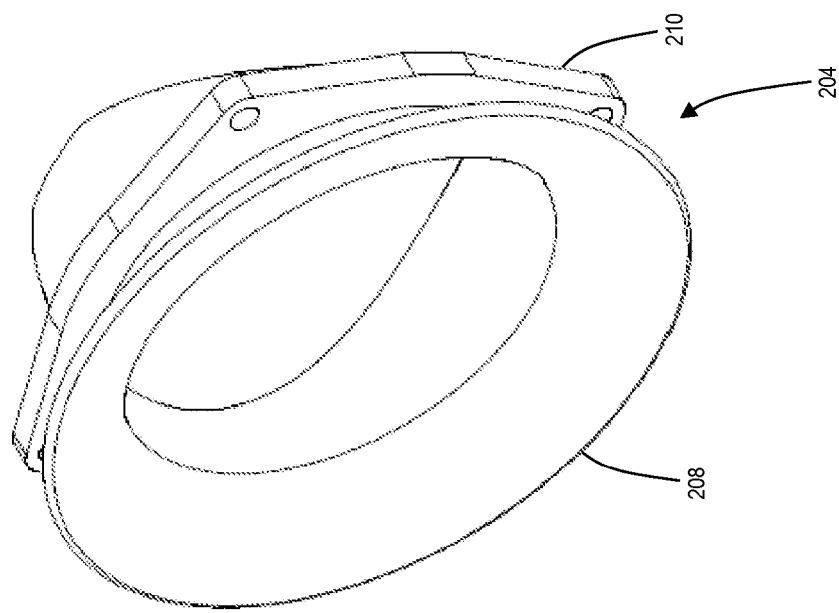
FIG. 8 is a perspective view of another exemplary embodiment of the internal valve seal of FIG. 6, the internal valve seal incorporating a velocity stack.

Referring now specifically to FIG. 8, another option is to incorporate a velocity stack 208 on the intake bracket 210 that holds the insert 204. The velocity stack 208 smooths the air flow and increases the velocity.

Figure 9:
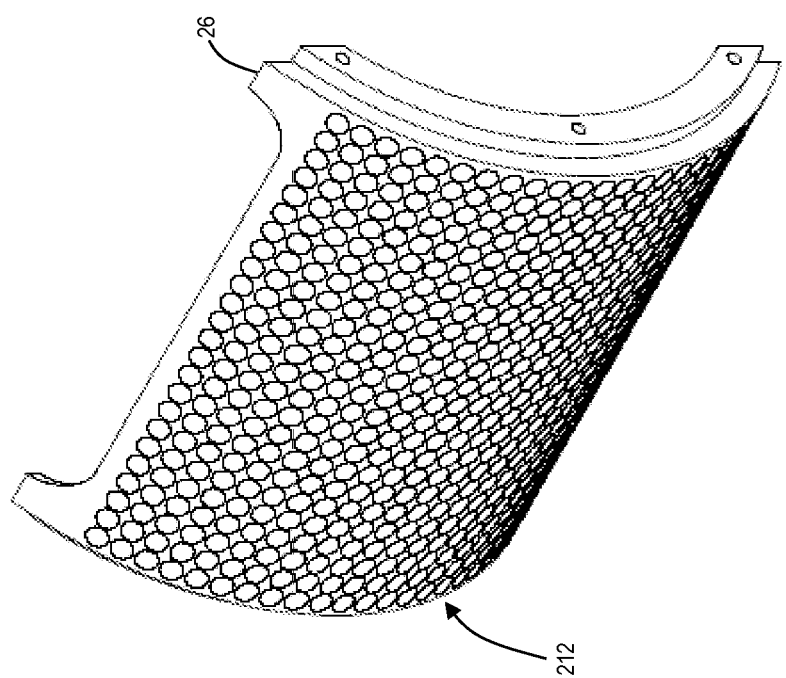
FIG. 9 is a perspective view of one exemplary embodiment of the valve door of FIG. 5, the valve door incorporating a plurality of manufactured dimples.

Referring now specifically to FIG. 9, when the insert 204 (FIG. 8) is in the front position and the air comes into contact with the valve door 26, there is a possibility that this could create undesirable air flow turbulence. To help alleviate this problem, dimples or other recesses 212 may be manufactured on the valve door 26 and other parts of the throttle body housing 12 (FIGS. 5 and 6) that are similar to that manufactured on a golf ball. Since the valve door 26 has the cylindrical geometry of a sphere or cylinder, there are benefits in the flow characteristics of these dimples or other recesses 212. They create a thin turbulent boundary layer of air that brings higher velocities and reduces air drag as the valve door 26 is operated in partially-open position.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims.

What is claimed is:

1. A cylindrical valve assembly, comprising:
   a housing defining a port, a cylindrical interior volume, and a cylindrical interior surface;
   a lip structure disposed about the periphery of the port, wherein the lip structure protrudes beyond the port into the cylindrical interior volume past the cylindrical interior surface of the housing; and
   a valve door defining an exterior surface disposed concentrically within the housing, wherein the valve door is configured to move from an open configuration in which it does not obstruct the port to a closed configuration in which it does obstruct the port, and wherein, when the valve door is in the closed configuration, the exterior surface of the valve door is in contact with the lip structure and not the cylindrical interior surface of the housing;
   wherein the lip structure is provided by an insert structure that is disposed through the port, and wherein an end of the insert structure opposite the lip structure comprises a velocity stack.

2. The cylindrical valve assembly of claim 1, wherein the valve door comprises a pair of valve doors.

3. The cylindrical valve assembly of claim 1, wherein a plurality of recesses are manufactured into the exterior surface of the valve door.

4. The cylindrical valve assembly of claim 3, wherein the plurality of recesses comprises a plurality of dimples.

5. A method for providing a cylindrical valve assembly, comprising:
   providing a housing defining a port, a cylindrical interior volume, and a cylindrical interior surface;
   providing a lip structure disposed about the periphery of the port, wherein the lip structure protrudes beyond the port into the cylindrical interior volume past the cylindrical interior surface of the housing; and providing a valve door defining an exterior surface disposed concentrically within the housing, wherein the valve door is configured to move from an open configuration in which it does not obstruct the port to a closed configuration in which it does obstruct the port, and wherein, when the valve door is in the closed configuration, the exterior surface of the valve door is in contact with the lip structure and not the cylindrical interior surface of the housing;

wherein the lip structure is provided by an insert structure that is disposed through the port, and wherein an end of the insert structure opposite the lip structure comprises a velocity stack.

6. The method for providing the cylindrical valve assembly of claim 5, wherein the valve door comprises a pair of valve doors.

7. The method for providing the cylindrical valve assembly of claim 5, wherein a plurality of recesses are manufactured into the exterior surface of the valve door.

8. The method for providing the cylindrical valve assembly of claim 7, wherein the plurality of recesses comprises a plurality of dimples.

9. A cylindrical valve assembly, comprising:

a housing defining a port and a cylindrical interior surface;

a valve door defining an exterior surface disposed concentrically within the housing and in contact with the cylindrical interior surface, wherein the valve door is configured to move from an open configuration in which it does not obstruct the port to a closed configuration in which it does obstruct the port;

wherein a recess is manufactured into a portion of the cylindrical interior surface of the housing adjacent to the port that provides a gap between the portion of the cylindrical interior surface of the housing and a portion of the exterior surface of the valve door when the valve door is in the open configuration; and a velocity stack coupled to an exterior surface of the hosing about the periphery of the port.

10. The cylindrical valve assembly of claim 9, wherein the valve door comprises a pair of valve doors and the recess comprises a pair of recesses.

11. The cylindrical valve assembly of claim 9, wherein a plurality of recesses are manufactured into the exterior surface of the valve door.

12. The cylindrical valve assembly of claim 11, wherein the plurality of recesses comprises a plurality of dimples.

* * * * *